United States Patent
Luo et al.

(10) Patent No.: US 10,148,753 B2
(45) Date of Patent: Dec. 4, 2018

(54) METHOD, SERVER, AND SYSTEM FOR SYNCHRONIZING GROUP MEMBER INFORMATION

(71) Applicant: Tencent Technology (Shenzhen) Company Limited, Shenzhen, Guangdong (CN)

(72) Inventors: Weiming Luo, Guangdong (CN); Xiaomin Xu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 231 days.

(21) Appl. No.: 15/192,346

(22) Filed: Jun. 24, 2016

(65) Prior Publication Data

US 2016/0308964 A1 Oct. 20, 2016

Related U.S. Application Data

(63) Continuation of application No. PCT/CN2015/080777, filed on Jun. 4, 2015.

(30) Foreign Application Priority Data

Jun. 11, 2014 (CN) .......................... 2014 1 0258949

(51) Int. Cl.
*H04L 12/18* (2006.01)
*H04L 29/06* (2006.01)
*H04L 29/08* (2006.01)

(52) U.S. Cl.
CPC ........ *H04L 67/1095* (2013.01); *H04L 12/185* (2013.01); *H04L 12/1859* (2013.01); *H04L 69/04* (2013.01)

(58) Field of Classification Search
None
See application file for complete search history.

(56) References Cited

U.S. PATENT DOCUMENTS 8,301,853 B1 * 10/2012 Madnani ............. G06F 11/2058
711/162
8,386,425 B1 2/2013 Kadayam et al.
(Continued)

FOREIGN PATENT DOCUMENTS

CN 101218784 A 7/2008
CN 102149078 A 8/2011
(Continued)

OTHER PUBLICATIONS

International Search Report and Written Opinion received in PCT Application No. PCT/CN2015/080777 dated Sep. 14, 2015.
(Continued)

*Primary Examiner* — Brian Whipple
(74) *Attorney, Agent, or Firm* — Brinks Gilson & Lione

(57) ABSTRACT

A method, server, and system for synchronizing group member information are described. The method includes: acquiring, by the server, group member information of a group in an interval of a predetermined time, and generating mirror data of the group member information; maintaining incremental information of the group member information that is on the basis of the mirror data; and sending the mirror data and the incremental information to a terminal on which a group member that newly joins in the group is located.

20 Claims, 4 Drawing Sheets

(56) References Cited

U.S. PATENT DOCUMENTS

| | | |
|---|---|---|
| 2007/0021137 A1 | 1/2007 | Kokkonen et al. |
| 2011/0134762 A1* | 6/2011 | Chen .................. H04L 43/0864 370/252 |
| 2011/0238820 A1* | 9/2011 | Matsuoka ............. G06F 9/5077 709/224 |
| 2012/0173620 A1* | 7/2012 | Holostov ............ H04L 67/1048 709/204 |
| 2013/0013566 A1 | 1/2013 | Miller et al. |
| 2013/0223303 A1* | 8/2013 | Nakakuki .............. G08G 1/094 370/310 |
| 2016/0227385 A1* | 8/2016 | Ahmad ............... H04L 65/4061 |
| 2017/0154093 A1* | 6/2017 | Shetty .................... G06F 3/065 |

FOREIGN PATENT DOCUMENTS

| | | |
|---|---|---|
| CN | 102521083 A | 6/2012 |
| CN | 102739706 A | 10/2012 |
| CN | 102841759 A | 12/2012 |
| CN | 103294701 A | 9/2013 |
| WO | WO 2007/004052 A2 | 1/2007 |

OTHER PUBLICATIONS

First Chinese Office Action to Application No. 201410258949.1 dated Dec. 22, 2014.
Granted Chinese Patent to priority application dated Aug. 13, 2014.

\* cited by examiner

METHOD, SERVER, AND SYSTEM FOR SYNCHRONIZING GROUP MEMBER INFORMATION

CROSS-REFERENCE TO RELATED APPLICATIONS

This application is a continuation of International Application No. PCT/CN2015/080777, filed on Jun. 4, 2015, which claims the priority to Chinese Patent Application No. 201410258949.1, filed on Jun. 11, 2014, which are incorporated herein by reference in their entirety.

FIELD OF THE TECHNOLOGY

The present disclosure relates to the field of communications technologies, and in particular, to a method, server, and system for synchronizing group member information.

BACKGROUND OF THE DISCLOSURE

In an Internet application, users often need to gather for a group activity, for example, a colleague group, a city friends group, and a conference group. A user inside of a group needs to learn member information of group members; however, when a user joins in or withdraws from a group, group member information changes, which requires a server to synchronize the group member information.

In an application scenario for a mega-class extra large group, each group member can obtain member information that includes a list of other members of the group. For joining and withdrawal of a group member, each member of the group receives a broadcast message, and thereby a local list is maintained in real time. For example, a star is an honored guest or gives a performance in a group; and in this scenario, a large number of users gather together.

In a process of implementing the synchronization of the group member information, the server has the following functions:

the server stores and maintains information (which is generally represented in a group member list) about all members of the group, and updates the group member information after a group member enters or exits; if a group member enters, current member information of the server is sent to the group member that newly enters, and a message is pushed to all members of the group, declaring that a group member enters; and in an application scenario with an extra large group, due to a limitation by a factor such as network bandwidth, the group member information is not sent all at once but generally needs to be sent in segments for multiple times to the group member that newly enters.

In the foregoing solutions, a server needs to send current member information to a group member that newly enters, and therefore a data packet of corresponding group member information needs to be generated for each group member that newly enters. In a scenario in which there are many group members that newly enter within a short period of time, overload of the server is easily caused, causing a network service to be unstable.

SUMMARY

Embodiments of the present invention provide a method, server, and system for synchronizing group member information, for reducing a transient data processing amount of the server, and improving stability of the server.

A method for synchronizing group member information includes:

acquiring group member information of a group in an interval of a predetermined time, and generating mirror data of the group member information;

maintaining incremental information of the group member information that is on the basis of the mirror data; and sending the mirror data and the incremental information to a terminal on which a group member that newly joins in the group is located.

A server includes:

a data generating unit, configured to acquire group member information of a group in an interval of a predetermined time, and generate mirror data of the group member information;

an information maintenance unit, configured to maintain incremental information of the group member information that is on the basis of the mirror data; and a data sending unit, configured to send the mirror data and the incremental information to a terminal on which a group member that newly joins in the group is located.

A system for synchronizing group member information includes: a terminal and a server that are connected in a communication-capable manner, the server being the server according to any one provided in embodiments of the present invention.

It can be seen from the foregoing technical solutions, the server in embodiments of the present invention does not need to generate and send a data packet of the group member information for each new group member any longer, and only needs to send same mirror data generated in advance to a new group member, and maintain and send the incremental information; and does not need to separately acquire the group member information for new group members, which can reduce a transient data processing amount of the server; and therefore even in a scenario in which there are many group members that newly enter within a short period of time, an overload phenomenon does not occur on the server, which can improve stability of the server.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
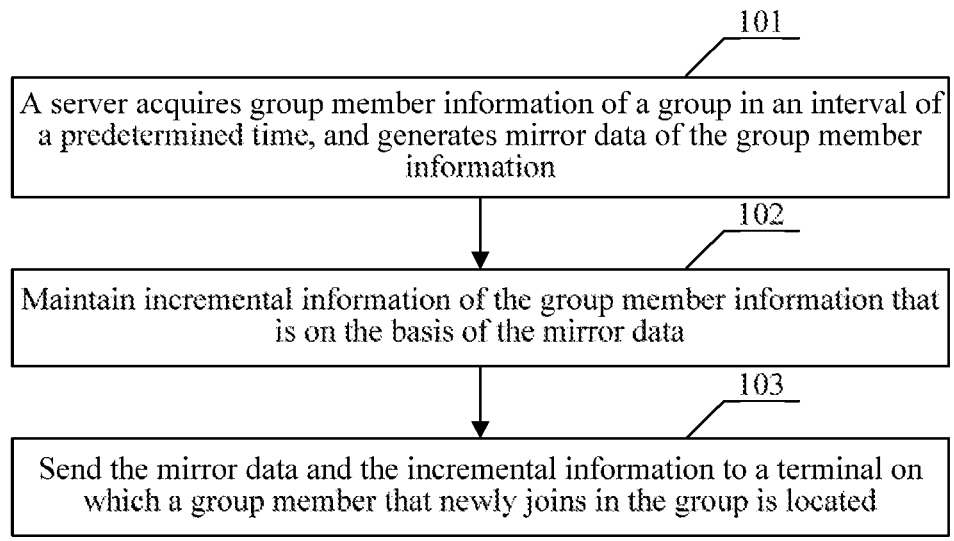
FIG. 1 is a schematic flowchart of a method according to an embodiment of the present invention.

An embodiment of the present invention provides a method for synchronizing group member information, as shown in FIG. 1, including:

101: A server acquires group member information of a group in an interval of a predetermined time, and generates mirror data of the group member information.

In this embodiment of the present invention, the time interval for acquiring the group member information (which may also be understood as a time interval for generating the mirror data) may be set by a skilled person; and generally a quantity of members included in a group, a group member change activity, a group type, and the like may be considered, for convenience of flexible setting. The time interval herein may be a fixed value, or may be a dynamic value that may be set according to a predetermined rule. A specific value is not limited in this embodiment of the present invention.

In this embodiment of the present invention, the group member information is information that identifies a group member, and most basically includes a member identifier of the group member, and may further include signature information, name card information, and the like. Specific composition of the group member information does not affect an implementation of this embodiment of the present invention, which is not limited in this embodiment of the present invention.

102: Maintain incremental information of the group member information that is on the basis of the mirror data.

In this embodiment of the present invention, the incremental information is information that records a change of the group member information, and includes: a group that a group member enters/exits. If the group member information further includes others, for example, the signature information and the name card information, the foregoing incremental information may also include modifications of the information. Specifically, the incremental information corresponds to the group member information, and a specific parameter included in the incremental information does not affect the implementation of this embodiment of the present invention, which is not limited in this embodiment of the present invention.

In this embodiment of the present invention, the mirror data is generated in a time interval, and then within a period between two adjacent pieces of mirror data, a case in which the group member information changes may occur; and in particular, in an application scenario with an extra large group, the case in which the group member information changes occurs more frequently. However, a moment when a group member that newly joins in the foregoing group may coincide with a moment when the mirror data is generated; and therefore the incremental information may also be blank, that is, in the incremental information, it is displayed that the group member information does not change.

103: Send the mirror data and the incremental information to a terminal on which a group member that newly joins in the group is located.

On a side of the terminal, a client that runs on the terminal receives the mirror data and the incremental information, the client decodes the received mirror data and incremental information, to be capable of obtaining the group member information; and then displays a member list.

In this embodiment of the present invention, the server does not need to generate and send a data packet of the group member information for each new group member any longer, and only needs to send same mirror data generated in advance to a new group member, and maintain and send the incremental information; and does not need to separately acquire the group member information for new group members, which can reduce a transient data processing amount of the server; and therefore even in a scenario in which there are many group members that newly enter within a short period of time, an overload phenomenon does not occur on the server, which can improve stability of the server.

In addition, for a group member that newly enters, the mirror data is generated in advance, which makes compression of the mirror data possible. If a solution in which the group member information is compressed is adopted in the background of the disclosure, the transient data processing amount of the server is further increased, which makes overload more easily occur on the server and the server more unstable. In this embodiment of the present invention, the mirror data is generated in advance, and compressing the mirror data in advance does not increase the transient data processing amount of the server. A compression solution in this embodiment is specifically as follows: further, before the sending the mirror data and the incremental information to a terminal on which a group member that newly joins in the group is located, the method further includes:

first compressing the foregoing mirror data, and then compressing the compressed mirror data and the foregoing incremental information.

The foregoing solution can reduce network transmission bandwidth through the compression of the mirror data and the incremental information.

In this embodiment of the present invention, the compression of the mirror data and the compression of the incremental information are layered compression, and therefore the compression of the incremental information does not affect the compression of the mirror data; and the mirror data may be relatively more compressed in advance, to make a data processing concentration ratio of the server lower, thereby making the transient data processing amount of the server lower. Accordingly, a specific solution provided in this embodiment of the present invention is as follows: optionally, the foregoing compressing the foregoing mirror data includes:

compressing the foregoing mirror data after the foregoing mirror data is obtained and before the foregoing incremental information is obtained.

Besides the new group members, group member information of another member of the group also needs to be synchronized; and therefore this embodiment of the present invention further provides a solution for synchronizing group member information of an original member of the group, which is specifically as follows: further, after the maintaining incremental information of the group member information that is on the basis of the mirror data, the method further includes:

sending the foregoing incremental information to a terminal on which a group member in the foregoing group other than the foregoing group member that newly joins in the foregoing group is located.

In addition, in an aspect of announcement of the incremental information, this embodiment of the present invention also provides a further improvement embodiment. In the background of the disclosure, when a group member changes, the server pushes a message to the group members, to declare that a group member enters or exits. In the application scenario with an extra large group, such messages are very frequent, causing a user not to be capable of seeing an information interaction inside the group. In addition, the server pushes the message very frequently, and the server needs many times of interactions, and occupies too many downlink bandwidth resources of the user. For this, a solution provided in this embodiment of the present invention is as follows: optionally, before the sending the foregoing incremental information, the method further includes:

adjusting a sending interval of a data packet of the foregoing incremental information according to a member quantity of the foregoing group, where a larger member quantity indicates a longer interval; adjusting a size of the data packet of the foregoing incremental information according to a current network quality, where a better current network quality indicates a larger data packet; and adjusting a quantity of group member information borne in a single data packet of the incremental information according to a member change frequency of the foregoing group, where a higher member change frequency indicates a larger quantity of group member information borne in the single data packet.

In this embodiment of the present invention, for the foregoing sending interval of the data packet of the foregoing incremental information, an adjustment interval of the time interval may be set, and it is not that the time interval is extended or shortened unlimitedly. For the size of the data packet, an adjustment interval of the size may also be set, and it is not that the size of the data packet is increased or decreased unlimitedly; and for the quantity of group member information borne in the single data packet, an adjustment curve may also be set, and it is not that the quantity of group member information borne in the single data packet is increased or decreased unlimitedly. A specific adjustment interval may be determined according to an empirical value, and a specific value is not strictly limited in this embodiment of the present invention.

In the following embodiment, an application with an extra large group is used as an example, and the group member list is used as a carrier for the obtained group member information, to describe this embodiment of the present invention by using an example.

To reduce times of interactions for acquiring the group member list, and reduce a broadcast quantity of the server, in this embodiment of the present invention, mirror processing of a group member is used on the basis of the synchronization policy in the background of the disclosure. A specific solution is as follows:

mirror definition: recording a member list and member information of the extra large group at a moment, and generating a data packet with a fixed size, where a data change after the moment is stored by using an increment.

Figure 2:
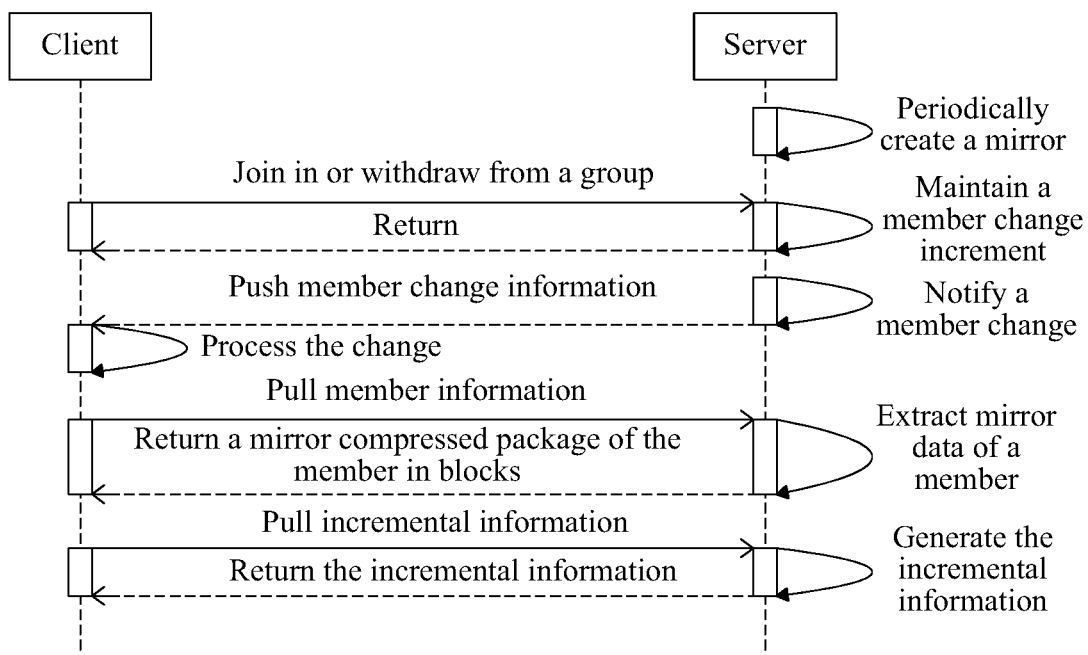
FIG. 2 is a schematic flowchart of a method according to an embodiment of the present invention.

Refer to FIG. 2 for an implementation procedure in this embodiment of the present invention, which includes the following steps:

201: A server periodically performs mirror processing on group member information of a member of an extra large group, and may record a timestamp of a mirror creation moment and a mirror version member; and continues to compresses mirror data, to reduce network transmission bandwidth; and after creating a mirror, the server records an incremental change of used group member information subsequent to the mirror creation moment, including data such as a group member information change and member joining and withdrawal.

202: A client sends a request for joining in or withdrawing from the group to the server at a back end.

203: The server maintains a group member incremental change, and records member change information.

204: The server returns a joining or withdrawal result to the client.

205: The server notifies a member change by using a group member change increment, and pushes member change information (the member change increment) to the client.

Sending of the group member change increment may be controlled in three dimensions, specifically as follows:

an incremental package time interval: controlling an increment synchronization frequency, and improving user experience;

an incremental package data size: controlling an incremental package size, and preventing a too large data packet from appearing; and an incremental package member change quantity: controlling a member change quantity, and optimizing a client processing time.

206: After receiving incremental information, the client processes the change.

207: The client initiates a member information pulling request to the server.

208: The server extracts mirror data of a member according to a mirror data size, and returns a mirror compressed package of the member in blocks to the client.

Repeat 207 and 208, until the client pulls all mirror data blocks, and displays member information.

209: The client initiates an increment member information data pulling request to the server.

210: The server generates incremental information, and returns the incremental information to the client.

In this embodiment of the present invention, network interactions and traffics between a client and a server can be reduced, and a processing capability of the server can be improved. Through control of a group member change increment, a customized data synchronization solution is implemented, to perform customized processing according to a service pressure and network status.

Figure 3:
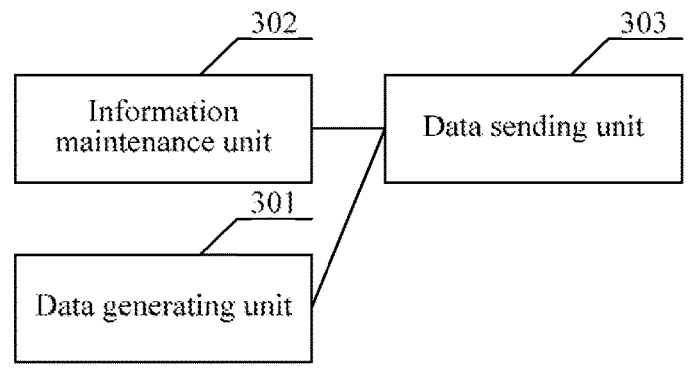
FIG. 3 is a schematic structural diagram of a server according to an embodiment of the present invention.

An embodiment of the present invention provides a server, as shown in FIG. 3, including:

a data generating unit 301, configured to acquire group member information of a group in an interval of a predetermined time, and generate mirror data of the foregoing group member information;

an information maintenance unit 302, configured to maintain incremental information of the group member information that is on the basis of the foregoing mirror data; and a data sending unit 303, configured to send the foregoing mirror data and the foregoing incremental information to a terminal on which a group member that newly joins in the foregoing group is located.

In this embodiment of the present invention, the time interval for acquiring the group member information (which may also be understood as a time interval for generating the mirror data) may be set by a skilled person; and generally a quantity of members included in a group, a group member change activity, a group type, and the like may be considered, for convenience of flexible setting. The time interval herein may be a fixed value, or may be a dynamic value that may be set according to a predetermined rule. A specific value is not limited in this embodiment of the present invention.

In this embodiment of the present invention, the group member information is information that identifies a group member, and most basically includes a member identifier of the group member, and may further include signature information, name card information, and the like. Specific composition of the group member information does not affect an implementation of this embodiment of the present invention, which is not limited in this embodiment of the present invention.

In this embodiment of the present invention, the incremental information is information that records a change of the group member information, and includes: a group that a group member enters/exits. If the group member information further includes others, for example, the signature information and the name card information, the foregoing incremental information may also include modifications of the information. Specifically, the incremental information corresponds to the group member information, and a specific parameter included in the incremental information does not affect the implementation of this embodiment of the present invention, which is not limited in this embodiment of the present invention.

In this embodiment of the present invention, the mirror data is generated in a time interval, and then within a period between two adjacent pieces of mirror data, a case in which the group member information changes may occur; and in particular, in an application scenario with an extra large group, the case in which the group member information changes occurs more frequently. However, a moment when a group member that newly joins in the foregoing group may coincide with a moment when the mirror data is generated; and therefore the incremental information may also be blank, that is, in the incremental information, it is displayed that the group member information does not change.

On a side of the terminal, a client that runs on the terminal receives the mirror data and the incremental information, the client decodes the received mirror data and incremental information, to be capable of obtaining the group member information; and then displays a member list.

In this embodiment of the present invention, the server does not need to generate and send a data packet of the group member information for each new group member any longer, and only needs to send same mirror data generated in advance to a new group member, and maintain and send the incremental information; and does not need to separately acquire the group member information for new group members, which can reduce a transient data processing amount of the server; and therefore even in a scenario in which there are many group members that newly enter within a short period of time, an overload phenomenon does not occur on the server, which can improve stability of the server.

Figure 4:
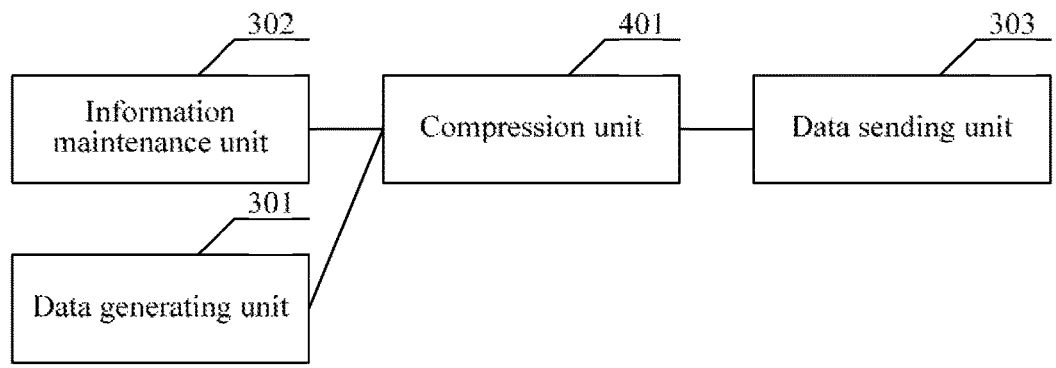
FIG. 4 is a schematic structural diagram of a server according to an embodiment of the present invention.

In addition, for a group member that newly enters, the mirror data is generated in advance, which makes compression of the mirror data possible. If a solution in which the group member information is compressed is adopted in the background of the disclosure, the transient data processing amount of the server is further increased, which makes overload more easily occur on the server and the server more unstable. In this embodiment of the present invention, the mirror data is generated in advance, and compressing the mirror data in advance does not increase the transient data processing amount of the server. A compression solution in this embodiment is specifically as follows: further, as shown in FIG. 4, the foregoing server further includes:

a compression unit 401, configured to: before the sending the mirror data and the incremental information to a terminal on which a group member that newly joins in the group is located, first compress the foregoing mirror data, and then compress the compressed mirror data and the foregoing incremental information.

The foregoing solution can reduce network transmission bandwidth through the compression of the mirror data and the incremental information.

In this embodiment of the present invention, the compression of the mirror data and the compression of the incremental information are layered compression, and therefore the compression of the incremental information does not affect the compression of the mirror data; and the mirror data may be relatively more compressed in advance, to make a data processing concentration ratio of the server lower, thereby making the transient data processing amount of the server lower. Accordingly, a specific solution provided in this embodiment of the present invention is as follows: optionally, the foregoing compression unit 401 is configured to compress the foregoing mirror data after the foregoing mirror data is obtained and before the foregoing incremental information is obtained.

Besides the new group members, group member information of another member of the group also needs to be synchronized; and therefore this embodiment of the present invention further provides a solution for synchronizing group member information of an original member of the group, which is specifically as follows: further, the foregoing data sending unit 303 is further configured to: after the maintaining incremental information of the group member information that is on the basis of the mirror data, send the foregoing incremental information to a terminal on which a group member in the foregoing group other than the foregoing group member that newly joins in the foregoing group is located.

Figure 5:
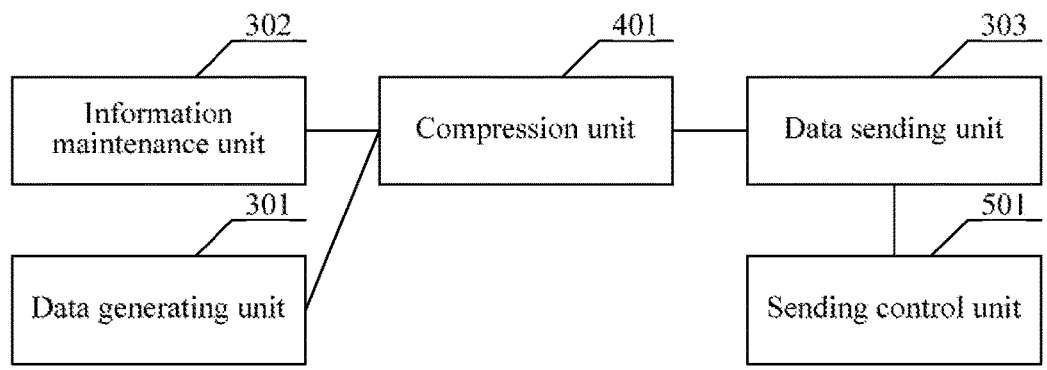
FIG. 5 is a schematic structural diagram of a server according to an embodiment of the present invention.

In addition, in an aspect of announcement of the incremental information, this embodiment of the present invention also provides a further improvement embodiment. In the background of the disclosure, when a group member changes, the server pushes a message to the group members, to declare that a group member enters or exits. In the application scenario with an extra large group, such messages are very frequent, causing a user not to be capable of seeing an information interaction inside the group. In addition, the server pushes the message very frequently, and the server needs many times of interactions, and occupies too many downlink bandwidth resources of the user. For this, a solution provided in this embodiment of the present invention is as follows: further, as shown in FIG. 5, the foregoing server further includes:

a sending control unit 501, configured to adjust a sending interval of a data packet of the foregoing incremental information according to a member quantity of the foregoing group, where a larger member quantity indicates a longer interval; adjust a size of the data packet of the foregoing incremental information according to a current network quality, where a better current network quality indicates a larger data packet; and adjust a quantity of group member information borne in a single data packet of the incremental information according to a member change frequency of the foregoing group, where a higher member change frequency indicates a larger quantity of group member information borne in the single data packet.

In this embodiment of the present invention, for the foregoing sending interval of the data packet of the foregoing incremental information, an adjustment interval of the time interval may be set, and it is not that the time interval is extended or shortened unlimitedly. For the size of the data packet, an adjustment interval of the size may also be set, and it is not that the size of the data packet is increased or decreased unlimitedly; and for the quantity of group member information borne in the single data packet, an adjustment curve may also be set, and it is not that the quantity of group member information borne in the single data packet is increased or decreased unlimitedly. A specific adjustment interval may be determined according to an empirical value, and a specific value is not strictly limited in this embodiment of the present invention.

Figure 6:
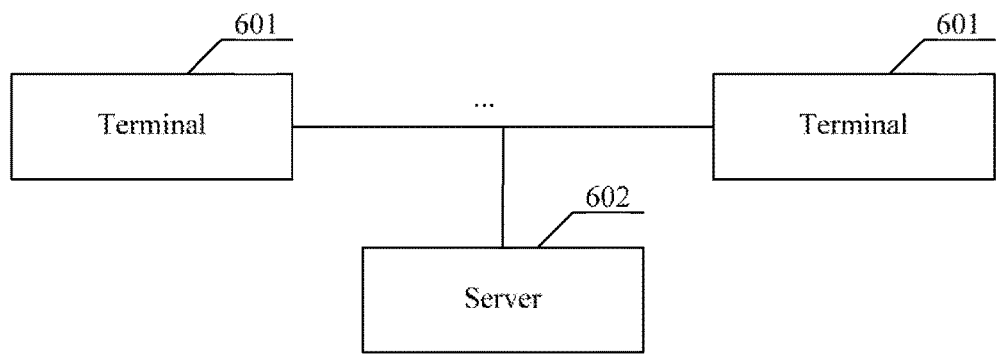
FIG. 6 is a schematic structural diagram of a server according to an embodiment of the present invention.

As shown in FIG. 6, a system for synchronizing group member information includes: a terminal 601 and a server 602 that are connected in a communication-capable manner, where the server 602 is the server according to any one provided in embodiments of the present invention. In the system shown in FIG. 6, only two terminals are illustrated. Actually, a quantity of terminals may be many, and a structure shown in FIG. 6 is used only as an example, and should not be understood as a limitation on this embodiment of the present invention.

In this embodiment of the present invention, the server does not need to generate and send a data packet of the group member information for each new group member any longer, and only needs to send same mirror data generated in advance to a new group member, and maintain and send the incremental information; and does not need to separately acquire the group member information for new group members, which can reduce a transient data processing amount of the server; and therefore even in a scenario in which there are many group members that newly enter within a short period of time, an overload phenomenon does not occur on the server, which can improve stability of the server.

Figure 7:
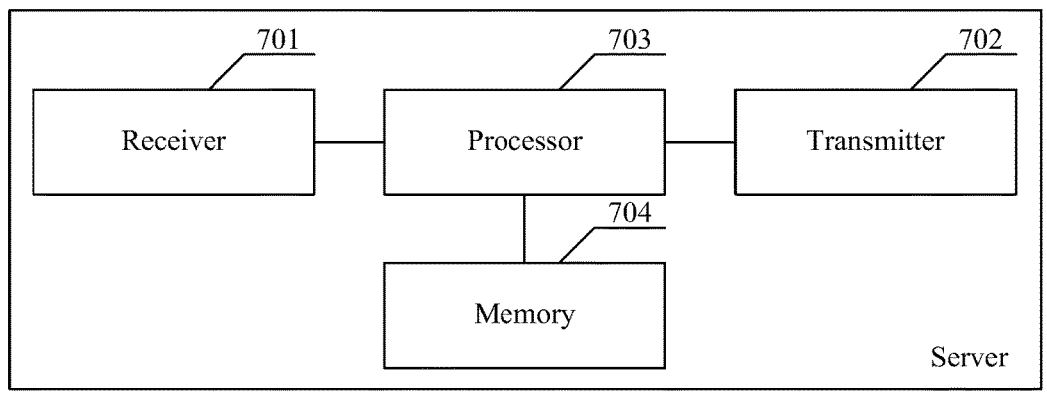
FIG. 7 is a schematic structural diagram of a server according to an embodiment of the present invention.

An embodiment of the present invention further provides another server, as shown in FIG. 7, including: a receiver 701, a transmitter 702, a processor 703, and a memory 704, where the processor 703 is configured to control execution of: acquiring, by a server, group member information of a group in an interval of a predetermined time, and generating mirror data of the group member information; maintaining incremental information of the group member information that is on the basis of the mirror data; and sending the mirror data and the incremental information to a terminal on which a group member that newly joins in the group is located.

In this embodiment of the present invention, the time interval for acquiring the group member information (which may also be understood as a time interval for generating the mirror data) may be set by a skilled person; and generally a quantity of members included in a group, a group member change activity, a group type, and the like may be considered, for convenience of flexible setting. The time interval herein may be a fixed value, or may be a dynamic value that may be set according to a predetermined rule. A specific value is not limited in this embodiment of the present invention.

In this embodiment of the present invention, the group member information is information that identifies a group member, and most basically includes a member identifier of the group member, and may further include signature information, name card information, and the like. Specific composition of the group member information does not affect an implementation of this embodiment of the present invention, which is not limited in this embodiment of the present invention.

In this embodiment of the present invention, the incremental information is information that records a change of the group member information, and includes: a group that a group member enters/exits. If the group member information further includes others, for example, the signature information and the name card information, the foregoing incremental information may also include modifications of the information. Specifically, the incremental information corresponds to the group member information, and a specific parameter included in the incremental information does not affect the implementation of this embodiment of the present invention, which is not limited in this embodiment of the present invention.

In this embodiment of the present invention, the mirror data is generated in a time interval, and then within a period between two adjacent pieces of mirror data, a case in which the group member information changes may occur; and in particular, in an application scenario with an extra large group, the case in which the group member information changes occurs more frequently. However, a moment when a group member that newly joins in the foregoing group may coincide with a moment when the mirror data is generated; and therefore the incremental information may also be blank, that is, in the incremental information, it is displayed that the group member information does not change.

On a side of the terminal, a client that runs on the terminal receives the mirror data and the incremental information, the client decodes the received mirror data and incremental information, to be capable of obtaining the group member information; and then displays a member list.

In this embodiment of the present invention, the server does not need to generate and send a data packet of the group member information for each new group member any longer, and only needs to send same mirror data generated in advance to a new group member, and maintain and send the incremental information; and does not need to separately acquire the group member information for new group members, which can reduce a transient data processing amount of the server; and therefore even in a scenario in which there are many group members that newly enter within a short period of time, an overload phenomenon does not occur on the server, which can improve stability of the server.

In addition, for a group member that newly enters, the mirror data is generated in advance, which makes compression of the mirror data possible. If a solution in which the group member information is compressed is adopted in the background of the disclosure, the transient data processing amount of the server is further increased, which makes overload more easily occur on the server and the server more unstable. In this embodiment of the present invention, the mirror data is generated in advance, and compressing the mirror data in advance does not increase the transient data processing amount of the server. A compression solution in this embodiment is specifically as follows: further, the processor 703 is further configured to control execution of: before the sending the mirror data and the incremental information to a terminal on which a group member that newly joins in the group is located, first compressing the foregoing mirror data, and then compressing the compressed mirror data and the foregoing incremental information.

The foregoing solution can reduce network transmission bandwidth through the compression of the mirror data and the incremental information.

In this embodiment of the present invention, the compression of the mirror data and the compression of the incremental information are layered compression, and therefore the compression of the incremental information does not affect the compression of the mirror data; and the mirror data may be relatively more compressed in advance, to make a data processing concentration ratio of the server lower, thereby making the transient data processing amount of the server lower. Accordingly, a specific solution provided in this embodiment of the present invention is as follows: optionally, the foregoing processor 703 is configured to control execution of: compressing the foregoing mirror data after the foregoing mirror data is obtained and before the foregoing incremental information is obtained.

Besides the new group members, group member information of another member of the group also needs to be synchronized; and therefore this embodiment of the present invention further provides a solution for synchronizing group member information of an original member of the group, which is specifically as follows: further, the processor 703 is further configured to control execution of: after the maintaining incremental information of the group member information that is on the basis of the mirror data, sending the foregoing incremental information to a terminal on which a group member in the foregoing group other than the foregoing group member that newly joins in the foregoing group is located.

In addition, in an aspect of announcement of the incremental information, this embodiment of the present invention also provides a further improvement embodiment. In the background of the disclosure, when a group member changes, the server pushes a message to the group members, to declare that a group member enters or exits. In the application scenario with an extra large group, such messages are very frequent, causing a user not to be capable of seeing an information interaction inside the group. In addition, the server pushes the message very frequently, and the server needs many times of interactions, and occupies too many downlink bandwidth resources of the user. For this, a solution provided in this embodiment of the present invention is as follows: optionally, the processor 703 is further configured to control execution of: before the sending the foregoing incremental information, adjusting a sending interval of a data packet of the foregoing incremental information according to a member quantity of the foregoing group, where a larger member quantity indicates a longer interval; adjusting a size of the data packet of the foregoing incremental information according to a current network quality, where a better current network quality indicates a larger data packet; and adjusting a quantity of group member information borne in a single data packet of the incremental information according to a member change frequency of the foregoing group, where a higher member change frequency indicates a larger quantity of group member information borne in the single data packet.

In this embodiment of the present invention, for the foregoing sending interval of the data packet of the foregoing incremental information, an adjustment interval of the time interval may be set, and it is not that the time interval is extended or shortened unlimitedly. For the size of the data packet, an adjustment interval of the size may also be set, and it is not that the size of the data packet is increased or decreased unlimitedly; and for the quantity of group member information borne in the single data packet, an adjustment curve may also be set, and it is not that the quantity of group member information borne in the single data packet is increased or decreased unlimitedly. A specific adjustment interval may be determined according to an empirical value, and a specific value is not strictly limited in this embodiment of the present invention.

Figure 8:
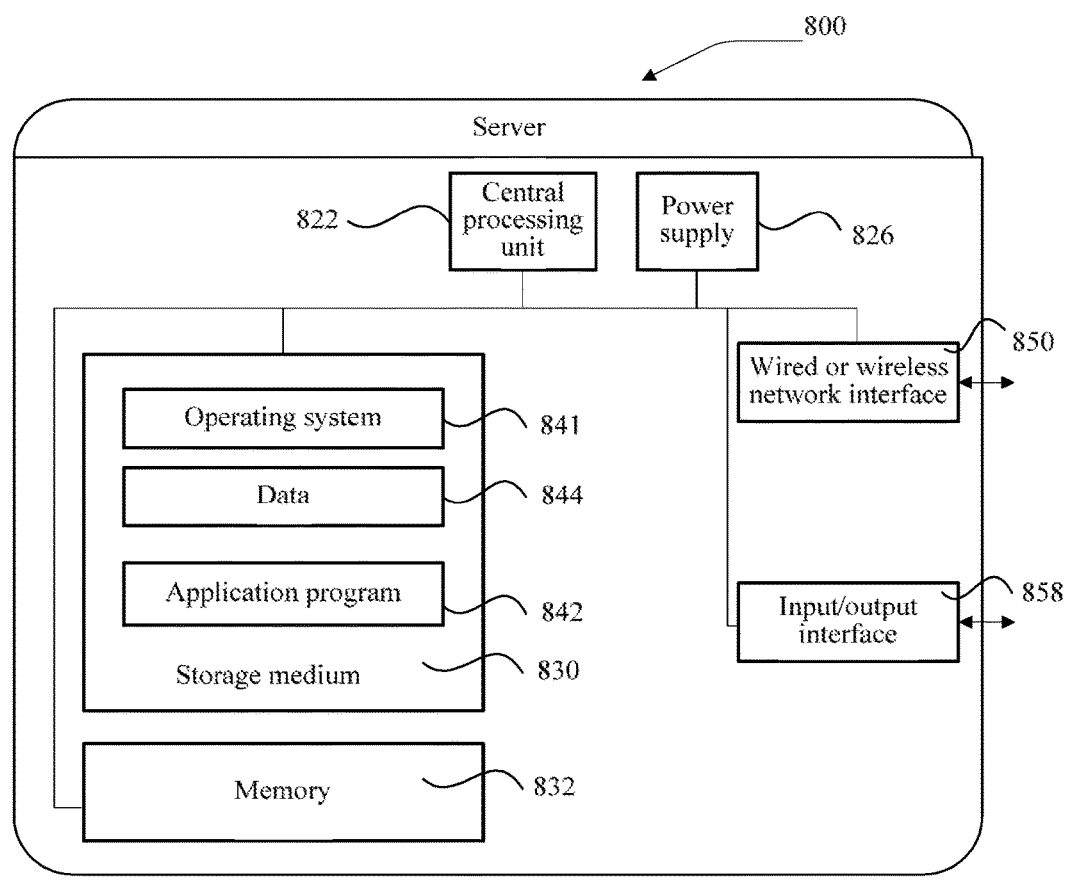
FIG. 8 is a schematic structural diagram of a server according to an embodiment of the present invention.

FIG. 8 is a schematic structural diagram of a server according to an embodiment of the present invention. The server 800 may differ greatly due to different configurations and performance, and may include one or more central processing units (CPU) 822 (for example, one or more processors) and memories 832, and one or more storage mediums 830 that store an application program 842 or data 844 (for example, one or more mass storage products). A memory 832 and a storage medium 830 may be used for transient storage or permanent storage. A program stored in the storage medium 830 may include one or more modules (which are not marked in the figure), and each module may include a series of instruction operations on the server. Further, the CPU 822 may be set to communicate with the storage medium 830, and perform, on the server 800, the series of instruction operations in the storage medium 830.

The server 800 may further include one or more power supplies 826, one or more wired or wireless network interfaces 850, one or more input/output interfaces 858, and/or, one or more operating systems 841, for example, Windows Server™, Mac OS X™, Unix™, Linux™, and FreeBSD™.

The steps performed by the server in the foregoing embodiments may be based on the server structure shown in FIG. 8.

It is noteworthy that, in the server embodiment described above, the included various units are divided based only on function logic, and the division is not limited to the foregoing division and is acceptable as long as the division can implement a corresponding function; additionally, a specific name of each functional unit is only for easy differentiation from each other, and is not used to limit a protection scope of the present invention.

In addition, a person of ordinary skill in the art may understand that all or a part of the steps in the foregoing method embodiments may be performed by a program instructing relevant hardware. The program may be stored in a computer readable storage medium. The storage medium may be a read-only memory, a magnetic disk, or an optical disc.

The foregoing is merely exemplary embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for synchronizing group member information, running in a server, the server comprising a memory, one or more processors, and a program instruction that is stored in the memory and executed by the one or more processors, and the method comprising:
    acquiring current group member information of a group in an interval of a predetermined time, and generating mirror data of the current group member information;
    maintaining incremental information of the current group member information that is on the basis of the mirror data, wherein the incremental information corresponds to a change in group member information between the current group member information and a prior group member information acquired immediately prior to the predetermined time interval; and sending the mirror data and the incremental information only to a terminal on which a group member that newly joins in the group is located in order to conserve server and network resources.

2. The method according to claim 1, wherein before the sending the mirror data and the incremental information only to a terminal on which a group member that newly joins in the group is located, the method further comprises:
compressing the mirror data; and
compressing the compressed mirror data and the incremental information.

3. The method according to claim 2, wherein the compressing the mirror data comprises:
compressing the mirror data after the mirror data is obtained and before the incremental information is obtained.

4. The method according to claim 3, wherein after the maintaining incremental information of the current group member information that is on the basis of the mirror data, the method further comprises:
sending only the incremental information to a terminal on which a group member in the group other than the group member that newly joins in the group is located.

5. The method according to claim 2, wherein after the maintaining incremental information of the current group member information that is on the basis of the mirror data, the method further comprises:
sending only the incremental information to a terminal on which a group member in the group other than the group member that newly joins in the group is located.

6. The method according to claim 1, wherein after the maintaining incremental information of the current group member information that is on the basis of the mirror data, the method further comprises:
sending only the incremental information to a terminal on which a group member in the group other than the group member that newly joins in the group is located.

7. The method according to claim 6, wherein before the sending the incremental information, the method further comprises:
adjusting a sending interval of a data packet of the incremental information according to a member quantity of the group, wherein a larger member quantity indicates a longer interval;
adjusting a size of the data packet of the incremental information according to a current network quality, wherein a better current network quality indicates a larger data packet; and
adjusting a quantity of group member information borne in a single data packet of the incremental information according to a member change frequency of the group, wherein a higher member change frequency indicates a larger quantity of group member information borne in the single data packet.

8. A server, comprising:
a memory;
one or more processors; and
one or more program units, being stored in the memory, and executed by the one or more processors, and the one or more program units comprising;
a data generating unit, configured to acquire current group member information of a group in an interval of a predetermined time, and generate mirror data of the current group member information;
an information maintenance unit, configured to maintain incremental information of the current group member information that is on the basis of the mirror data, wherein the incremental information corresponds to a change in group member information between the current group member information and a prior group member information acquired immediately prior to the predetermined time interval; and
a data sending unit, configured to send the mirror data and the incremental information only to a terminal on which a group member that newly joins in the group is located in order to conserve server and network resources.

9. The server according to claim 8, comprising:
a compression unit, configured to: before the sending the mirror data and the incremental information only to a terminal on which a group member that newly joins in the group is located, compress the compressed mirror data and the incremental information after compressing the mirror data.

10. The server according to claim 9, wherein
the compression unit is configured to compress the mirror data after the mirror data is obtained and before the incremental information is obtained.

11. The server according to claim 10, wherein the data sending unit is further configured to: after the maintaining incremental information of the current group member information that is on the basis of the mirror data, send only the incremental information to a terminal on which a group member in the group other than the group member that newly joins in the group is located.

12. The server according to claim 9, wherein
the data sending unit is further configured to: after the maintaining incremental information of the current group member information that is on the basis of the mirror data, send only the incremental information to a terminal on which a group member in the group other than the group member that newly joins in the group is located.

13. The server according to claim 8, wherein
the data sending unit is further configured to: after the maintaining incremental information of the current group member information that is on the basis of the mirror data, send only the incremental information to a terminal on which a group member in the group other than the group member that newly joins in the group is located.

14. The server according to claim 13, comprising:
a sending control unit, configured to adjust a sending interval of a data packet of the incremental information according to a member quantity of the group, wherein a larger member quantity indicates a longer interval; adjust a size of the data packet of the incremental information according to a current network quality, wherein a better current network quality indicates a larger data packet; and adjust a quantity of group member information borne in a single data packet of the incremental information according to a member change frequency of the group, wherein a higher member change frequency indicates a larger quantity of group member information borne in the single data packet.

15. A system for synchronizing group member information, comprising: a terminal and a server that are connected in a communication-capable manner, the server comprising:

a memory;

one or more processors; and one or more program units, being stored in the memory, and executed by the one or more processors, and the one or more program units comprising;

a data generating unit, configured to acquire current group member information of a group in an interval of a predetermined time, and generate mirror data of the current group member information;

an information maintenance unit, configured to maintain incremental information of the current group member information that is on the basis of the mirror data, wherein the incremental information corresponds to a change in group member information between the current group member information and a prior group member information acquired immediately prior to the predetermined time interval; and a data sending unit, configured to send the mirror data and the incremental information only to a terminal on which a group member that newly joins in the group is located in order to conserve server and network resources.

16. The server according to claim 15, comprising:

a compression unit, configured to: before the sending the mirror data and the incremental information to a terminal on which a group member that newly joins in the group is located, compress the compressed mirror data and the incremental information after compressing the mirror data.

17. The server according to claim 16, wherein the compression unit is configured to compress the mirror data after the mirror data is obtained and before the incremental information is obtained.

18. The server according to claim 16, wherein the data sending unit is further configured to: after the maintaining incremental information of the current group member information that is on the basis of the mirror data, send only the incremental information to a terminal on which a group member in the group other than the group member that newly joins in the group is located.

19. The server according to claim 15, wherein the data sending unit is further configured to: after the maintaining incremental information of the current group member information that is on the basis of the mirror data, send only the incremental information to a terminal on which a group member in the group other than the group member that newly joins in the group is located.

20. The server according to claim 19, comprising:

a sending control unit, configured to adjust a sending interval of a data packet of the incremental information according to a member quantity of the group, wherein a larger member quantity indicates a longer interval; adjust a size of the data packet of the incremental information according to a current network quality, wherein a better current network quality indicates a larger data packet; and adjust a quantity of group member information borne in a single data packet of the incremental information according to a member change frequency of the group, wherein a higher member change frequency indicates a larger quantity of group member information borne in the single data packet.

\* \* \* \* \*